Figure 1:
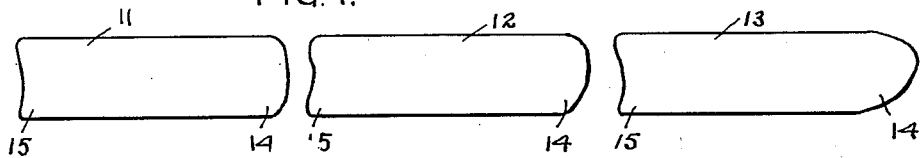

Oct. 6, 1931. W. C. CORYELL 1,825,854

METHOD OF MAKING METAL STRIPS

Filed Dec. 9, 1929

INVENTOR
WILLIAM C. CORYELL.
BY
Thomas H. Ferguson
ATTY.

Patented Oct. 6, 1931

1,825,854

UNITED STATES PATENT OFFICE

WILLIAM C. CORYELL, OF YOUNGSTOWN, OHIO, ASSIGNOR TO REPUBLIC STEEL CORPORATION, OF YOUNGSTOWN, OHIO, A CORPORATION OF NEW JERSEY

METHOD OF MAKING METAL STRIPS

Application filed December 9, 1929. Serial No. 412,782.

The present invention relates to the making of a continuous strip of metal out of several shorter strips. The industries have need of such lengthened strips in such manufacturing operations as those where it is desirable to change the process from an intermittent hand feed to continuous feed. More particularly such strips are desirable in the continuous rolling of strip over the old method of rolling short pieces intermittently.

Short pieces of metal have heretofore been made up into long pieces of metal by welding the ends together, but heretofore such welds have been made by squaring off the ends and abutting the same and welding in that position.

It is well known in the rolling art that hot rolled strips, particularly those rolled in short lengths are subject to more or less cambre in the two long edges. This cambre is produced in several different ways. One cause of cambre is inequality in thickness of the two edges of the original bar entering the hot mill. When such a bar is rolled to a uniform thickness across its width the edge which had the larger reduction becomes the longer edge and therefore that edge of the rolled strip becomes the outside edge, and it either causes buckles in that edge or causes the piece to be curved. Sometimes the piece being hot rolled may be of uniform thickness across the width when entering the hot mill, but due to improper setting of the cold rolling rolls, one edge is rolled thinner than the opposite edge, and we have the same difficulty as before. Practically all hot rolled strip is more or less affected by these and other conditions and is more or less uneven at the edges, as to absolute straightness and absolute even thickness.

Heretofore in welding up short pieces into long pieces, difficulties have arisen as to squaring the ends. No satisfactory method has been found for determining the exact longitudinal axis of the piece, which axis if determinable would be the line to use as a base for squaring the ends. Commonly the ends are squared with reference to some short length at the ends, five or ten feet, for example. If the conditions of hot rolling were such as to have produced a cambre at the end of the piece, then such squaring of the end is manifestly not square with the whole length of the piece.

The welding operation is usually done at another bench than the one where the shearing operation is performed. It, therefore, often results that the pieces brought together for welding appear not to be properly squared. Again, a wavy edge or buckled strip makes it difficult to properly square the end.

Usually in electric butt welding if the ends are not absolutely parallel with each other in the welding operation, but nearly parallel, it is possible to carry out the welding operation simply by burning away a small piece of the welded end, which is in excess of a properly squared end. On the other hand, ends slightly improperly squared may be welded together improperly, under an assumption that they are properly squared, in which case the welded piece will have an objectionable cambre at the weld.

The result of securing a number of short strips together end to end by this end squaring method is a long, continuous strip of considerable irregularity along its edges. If a true, or fairly true, longitudinal axis be taken and the composite strip trimmed according to that axis then the edges must be trimmed off parallel to that axis with a resulting great waste of material.

The principal object of the present invention is to provide a method of making continuous metal strip which shall be free from these objections and defects.

To this end I prepare each constituent strip by cutting its ends to a circular curve which makes up a considerable arc of curvature. If the trimming of the end is slightly inaccurate, as is likely to be the case, the operator may slide one curved end laterally along the other curved end in which case the axis of one piece is rotated with reference to the axis of the other piece. It is true this produces a slight offset in the welded strip, but this offset in continuous rolling is not objectionable because the overhung points may be sheared off obliquely, in which case the welded joint will pass through the mill satisfactorily. In this case of rotation of the axes the edges will be made parallel to the straight line axis, even though the trimming of the ends is not perfect.

For a fuller understanding of the invention and its advantages reference should be had to the following detailed description take in connection with the accompanying drawing while the scope of the invention will be particularly pointed out in the appended claims.

Figure 2:
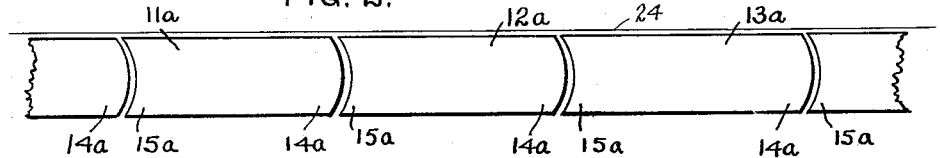
Figure 3:
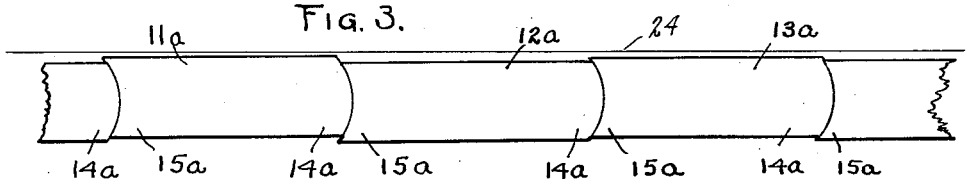
Figure 4:
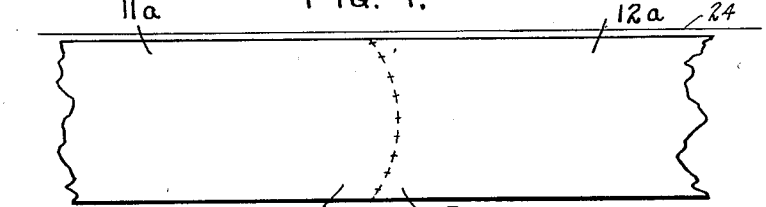
Figure 5:
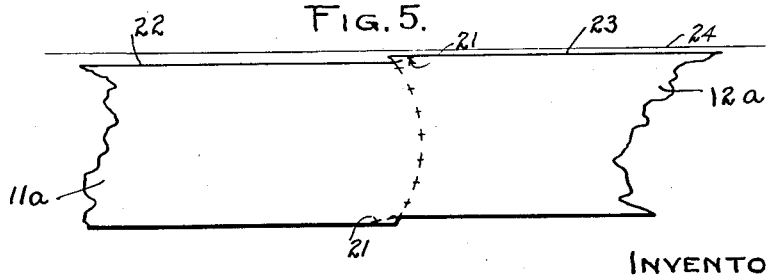

In said drawing, Fig. 1 represents several relatively short hot rolled strips as they come from the hot mill; Fig. 2 shows the arrangement of a number of such strips which have had their ends trimmed to a curve and ready to be welded into a continuous strip all in accordance with the present invention; Fig. 3 shows the same parts welded together to form the continuous strip; Fig. 4 shows the relation of two ends when they were properly prepared and when the resulting edges are straight lines parallel to the longitudinal axis of the long strip; and Fig. 5 shows how ends, trimmed as contemplated by the present invention, are placed together for welding even though there has been error in preparing the ends. Throughout these views like characters refer to like parts. It should also be noted that in Figs. 2, 3, and 4, there is a longitudinal reference line, parallel to the longitudinal axis of the strip, which assists in showing the departure of the strip constituents from perfect alignment.

In said drawing, the pieces 11, 12 and 13 are separate pieces each having been hot rolled as an individual. The ends 14 are the leading ends in the hot rolling, and ends 15 are the leaving ends of the pieces. In the old art those ends are cut away along straight transverse lines, usually at right angles (but sometimes obliquely) to the edge, at a distance back from the ends. Obviously, where the transverse cutting was not well done, there were gaps between the ends when lined up correctly according to the axis, or when the ends were made to properly abut the constituent pieces were out of alignment.

Now, as before stated, by the present method the pieces 11, 12 and 13 are curved at their ends to provide the pieces 11ª, 12ª and 13ª, respectively, ready for assembly and welding. The forward ends 14 have become the convexly curved ends 14ª and the leaving ends 15 have become the concavely curved ends 15ª. The convex and concave curves are identical in degree of curvature. In other words, both curves have the same radius of curvature. Preferably this radius is a long one, approximating one to two times the width of the strip, and the degree of curvature is small, approximating perhaps fifteen to thirty degrees. By so fixing the curvature, abutting ends can be readily fitted together without placing the constituent strips much out of longitudinal alignment. In general, the longer the radius the less the degree of end curvature and the more the lateral offsetting of the axes of the adjacent pieces. As before noted, in case the trimming of the ends in a given case is slightly inaccurate then one piece may be shifted to cause the convexly curved butt end to slide over the mating concavely curved butt end. The resulting offset of the constituent strips relative to each other, or to the longitudinal axis of the composite strip, is usually not objectionable in continuous rolling. In such case the overhung ends 21 may be sheared off obliquely, as shown by dotted lines in Fig. 5, and then the welded joint will pass through the mill in a satisfactory manner. Where the constituent pieces, as 11ª and 12ª, are rotated so as to provide these overhanging ends 21, the side edges 22 and 23 will not be in alignment but will be parallel. They may then be trimmed parallel to the reference line 24 which is parallel to the longitudinal axis of the continuous strip, if desired. Thus the edges may be made parallel even though there be an erroneous trimming or placing of the pieces. But it will be noted that the angular shifting of the pieces relative to each other does not require a separation of the butt ends. Consequently there is less loss due to poor welding than in the squared end process.

It should also be noted that the cambres above referred to as resulting from the hot rolling, are not so excessive that the amount of offsetting of the two edges 22 and 23 in common practice goes beyond the limits of what can be taken care of readily in the continuous cold rolling of strip. Since the continuous cold rolled strip will be sheared apart at intervals so as to produce marketable lengths, usually in finished coils, the offset welds will be chosen as much as possible as points for such shearing.

Two other advantages of this method may be mentioned. The action of hot rolling is such that the center is elongated more at the front end and the edges are elongated more at the rear end. Therefore I take advantage of this in dressing the front end of the piece with a convex curve and the rear end with a concave curve, and thereby save material that under the old squaring method would be scrapped.

If by any chance a defective weld is made at the edge, the defective point is protruding backwards and is less liable to catch on objects along its course of travel. This method therefore aids the welded point in passing through the mill and naturally lessens the amount of scrap that is produced.

Reference has been made to welding the pieces together for cold rolling. It is intended, however, that this invention is applicable to attaching the ends together preparatory to producing a long strip for any continuous operation, such as hot rolling, pickling, annealing, heat treating and other manufacturing processes.

What I claim as new and desire to secure by a patent of the United States is:

1. The method of producing a long continuous strip out of several short lengths of strip by trimming the ends of short pieces, one end convex and one end concave, the convex end of one piece being welded to the concave end of the other.

2. The method of producing a long strip out of several short lengths of strip, by trimming the ends of the short pieces to such a contour that the two adjoining pieces may be rotated with respect to each other to bring the longitudinal edges into parallelism.

3. In the method of producing a long strip out of several short lengths of strip, the step of giving the ends of each constituent strip curved contours, one convex and the other concave, to conform in general to the shape of the leading and leaving ends respectively of the piece as it comes hot rolled from the mill.

4. The method of producing continuous metal strip out of a series of short strips which consists in convexly and concavely trimming adjacent ends of the short strips to a butt weld fit, welding such ends together, and obliquely trimming the edges of individual short strips at their forward ends to remove points and projections at the weld that would interfere with easy passage of the composite strip through the pass of a mill.

5. In the method of producing a long strip out of several short lengths of strip, the steps of giving curved contours to the ends of each constituent piece, one contour being concave and the other convex, the said contours conforming closely to the contours of the ends of the piece when it comes hot rolled from the mill.

6. The method of conserving rolled material which consists in giving contours to the ends of each constituent piece, the one contour being concave and the other convex, the said contours conforming closely to the contours of the ends of the piece when it comes hot rolled from the mill, and then welding such pieces end to end, the convex end of one piece being fitted to the concave end of the next piece.

In witness whereof, I hereunto subscribe my name this 19th day of November, A. D. 1929.

WILLIAM C. CORYELL.